No. 874,388.

PATENTED DEC. 24, 1907.

T. J. BUTLER.
CLUTCH.
APPLICATION FILED JAN. 24, 1907.

WITNESSES:

INVENTOR:
Thomas J Butler,
BY
Fraentzel and Richards
ATTORNEYS

No. 874,388. PATENTED DEC. 24, 1907.
T. J. BUTLER.
CLUTCH.
APPLICATION FILED JAN. 24, 1907.

WITNESSES:
Anna H. Aeter
Frederick Jamison

INVENTOR:
Thomas J. Butler,
BY
Fraentzel and Richards,
ATTORNEYS

UNITED STATES PATENT OFFICE.

THOMAS J. BUTLER, OF HARRISON, NEW JERSEY.

CLUTCH.

No. 874,388.　　　Specification of Letters Patent.　　　Patented Dec. 24, 1907.

Application filed January 24, 1907. Serial No. 353,913.

*To all whom it may concern:*

Be it known that I, THOMAS J. BUTLER, a citizen of the United States, residing at Harrison, in the county of Hudson and State of New Jersey, have invented certain new and useful Improvements in Clutches; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference, generally, to improvements in clutches for use mainly in automobiles by means of which the power of the engine may be transmitted to the driving shaft which is geared to an axle of the wheels of the vehicle; and, the present invention relates, more particularly, to a novel clutch which may be used simply as a friction-drive, or may be combined with auxiliary devices to provide a direct drive between the power-driven shaft and the axle-driving shaft, and in which the friction-cones are arranged and operate in such a manner that all or only one of the friction-cones can be thrown in frictional holding engagement with the driving-cone, whereby a smaller or larger binding surface can be brought into operation, at the will of the driver of the machine, and the sudden jerky movement in starting up the car, caused by suddenly and directly throwing into engagement the contact-surfaces of the clutch are entirely overcome.

My present invention, therefore, has for its principal objects to provide a clutch for automobiles, but which however may also be otherwise used, in which a gradual operative connection is made between the power-driven shaft and the shaft to be driven, and with which may be combined, if desired, and is preferably used with automobiles, a direct-drive or clutch-device between said two shafts, said latter device being the last to be thrown into operation after the friction cones have been set in operation, and being the first to be disengaged, so that it will be seen, that my novel clutch while it can be used as a combined friction and direct drive, it will also be evident, that the clutch can be used simply in the manner of a friction clutch, and in employing more than one friction-cone, the engaging contact with the driving cone can be varied and increased or decreased, so that a greater or smaller contacting surface will be the result.

A further object of this invention is to provide a clutch-mechanism by which the power of the engine, or other source of motive power, may be steadily and constantly transmitted, and gradually thrown into or out of operation, so as not to cause any injury or breakage by any sudden or undue strain; to avoid the usual discomfort to the person or persons seated in the vehicle, when starting or stopping the car, as now ordinarily the case; and, finally, to relieve the shock or sudden strain which is occasioned by bringing the parts of the clutch in their operative engagement.

Other objects of this invention not at this time more particularly mentioned will be clearly understood from the following detailed description of this invention.

With the various objects of my present invention in view, the same consists, primarily, in the novel clutch hereinafter set forth; and, furthermore, this invention consists in the novel arrangements and combinations of the various devices and parts, as well as in the details of the construction of the same, all of which will be hereinafter more fully described and then finally embodied in the clauses of the claims which are appended to and which form an essential part of this specification.

The invention is clearly illustrated in the drawings, in which:—

Similar characters of reference are employed in all of the above described views, to indicate corresponding parts.

Figure 1:
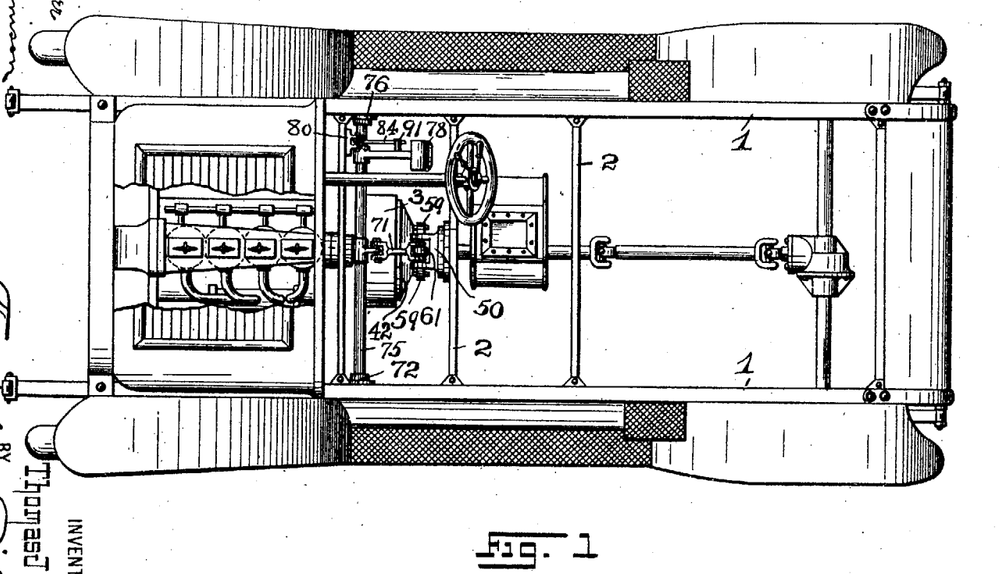
Figure 1 is a plan view of the chassis or main frame of the body of an automobile, showing in a more general or diagrammatical manner, one arrangement of my novel clutch-device arranged between the power-driven shaft and the shaft which is to be driven.

Referring now to the several figures of the drawings, the reference-character 1 indicates the chassis or main frame of the lower body of an automobile, and 2 are the usual cross-beams or bars, as shown more particularly in Fig. 1 of the drawings.

Figure 7:
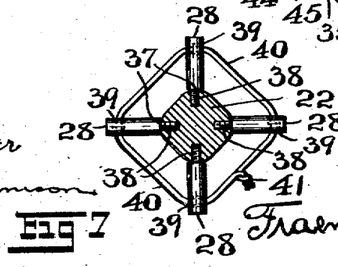
Fig. 7 is a detail cross-section taken on line 7—7 in said Fig. 2, the friction-cone and other parts of said device being omitted from said view.

The clutch-device is illustrated on an enlarged scale in Figs. 2, 4, 6 and 7 of the drawings, and it consists, essentially of a driving cone 3, formed with the chambered part 4, having its inner annular surface tapered or made cone-shaped, substantially in the manner represented in said figures of the drawings. Connected with the rear wall 5 of said driving-cone by means of bolts 6 and nuts 7, said bolts being preferably provided with cylindrical heads 8, is a hub-plate 9. Said plate has its centrally enlarged part 10 fitted into the centrally disposed open part 11 of said wall 5, and is provided with a receiving socket 12 and a boss 13, as clearly illustrated. Connected with said boss in any usual manner is a driving-shaft 14, which may be provided with a crank 15 or other means for operating or driving said shaft from a suitable engine, or other source of motive power. Suitably secured to one of the cross-beams or bars 2 of the chassis or frame-work 1, by means of bolts 16 and nuts 17, is a downwardly extending bracket or support 18 which carries a suitably constructed bearing 19, in which is rotatively arranged a shaft 20 which is to be driven from said driving shaft 14 by means of the clutch which embodies the principles of this invention. This shaft is usually provided with a screw-threaded part 21, from which extends the preferably squared portion 22, substantially as shown, said squared portion having at its free end a reduced cylindrical part or member 23 which is fitted and rotates in a suitable sleeve 24 arranged in the receiving socket 12 of the hub-plate 9. Slidably arranged upon said squared portion of the shaft 20, and within the chambered part 4 of the driving-cone 3, is a direct-drive disk or plate 25, which is provided with a hub 26 formed with suitably disposed and longitudinally extending slots 27, as shown in the several figures of the drawings. Extending into each slot 27 of said hub 26 is a post or pin 28, each post or pin radiating from one of the corner edges of the squared portion of the shaft 20, substantially as shown, the squared portion of said shaft retaining the disk or plate 25 in its slidable operative relation upon said shaft 20. A coiled spring 29 may be arranged upon that part of the hub 26, between said pins or posts and the face of the disk or plate 25, the purpose of which is clearly evident. The disk or plate 25 is provided at or near its marginal edge with a number of suitably formed openings or cutaway parts 30, the number of which corresponds to the number of cylindrical heads 8 of the bolts 6. Said openings, as will be clearly evident, are for the purpose of causing an operative engagement of the direct-drive disk or plate with the wall 5 of the driving-cone 3, as clearly shown in Figs. 2 and 3 of the drawings. The said openings, as will be seen more especially from an inspection of said Fig. 3, are elongated to more easily enable the entrance of each head 8 in the corresponding opening 30, during the manipulation of the disk or plate 25, in the manner to be hereinafter more fully described. Slidably disposed upon another part of the squared portion of said shaft 20 is a friction-cone 31 which is provided with a hub 32 formed with suitably disposed and longitudinally extending slots 33. Extending into each slot 33 of said hub 32 is a pin or post 34, each pin or post radiating from one of the corner-edges of the squared portion of the shaft 20, substantially as shown, and the squared portion of the shaft retaining said friction-cone 31 in slidable operative relation upon the shaft 20. A coiled spring 35 may be arranged upon that part of the hub 32, between said pins or posts 34 and the face of the friction-cone, the purpose of which is clearly evident. The annular cone-surface 35' of the friction-cone 31 is preferably provided with and is surrounded by an engaging or binding element, as 36, which is usually made of a suitable flexible material, such as leather, rubber, or other fabric, and which is adapted to engage and bind with and upon the inner annular cone-shaped surface of the driving cone 3, substantially as illustrated. In Fig. 7 of the drawings, I have shown the preferred method of securing either of said pins or posts 28 or 34 to the corner-edges of the squared portion of the shaft 20. It will be seen, that each pin or post is made with a shoulder 37 and a reduced and screw-threaded shank 38 which is screwed into the shaft until the shoulder 37 rests upon the corner edge-portion of the shaft. To prevent the pins or post becoming dislodged by vibration, or otherwise, the pins or posts are provided at or near their free ends with suitable openings or perforations, as 39, a wire or other suitable binding strand 40 being arranged to connect the several posts, in the manner shown, which can be sufficiently tightened, as at 41, to prevent the unscrewing or loosening of any one or all of said pins or posts. Slidably disposed upon another part of the squared portion of the shaft 20 is another friction-cone 42 which is provided with a hub 43, and has an annular cone-surface 44 which is preferably provided with and is surrounded by an engaging or binding element, as 45, which is usually made of a suitable flexible material, such as leather, rubber, or other fabric, and which is adapted to engage and bind with and upon the inner annular cone-shaped surface of the driving-cone 3, as clearly illustrated in Figs. 2, 4 and 5 of the drawings.

Upon the previously mentioned screw-threaded portion 21 of the shaft 20, are usually screwed the lock-nuts 46 and 47 and an adjusting nut 48, which latter nut bears against and is for the purpose of regulating the tension of a coiled spring 49 which is arranged upon said shaft, between the nut 48 and the end of the hub 43 of the friction-cone 42.

Figures 4, 8, 9:
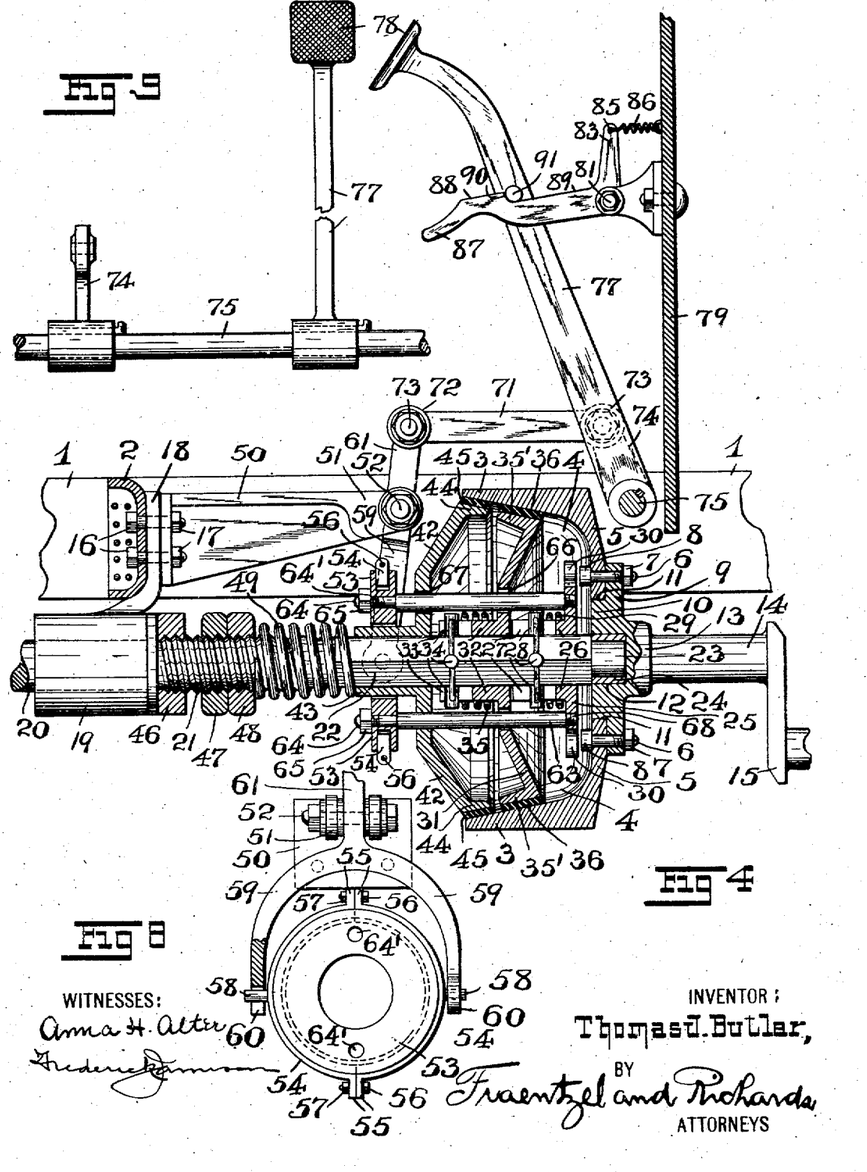
Fig. 4 is a view, similar to that shown in Fig. 2, but showing the direct-drive disk or plate of the clutch forced out of its operative engagement, when the clutch is used simply as a friction-drive, all the friction-cones being shown in their operative frictional engagement with the driving-cone.
Fig. 8 is a detail view of the yoke-device employed for the purposes of moving the direct-drive disk or plate and the friction-cones back and forth upon the shaft upon which the clutch is mounted.
Fig. 9 is a detail face view of a rock-shaft and a crank-arm thereon, with the foot-controlled lever or arm employed for operating the yoke.
Figures 5, 6:
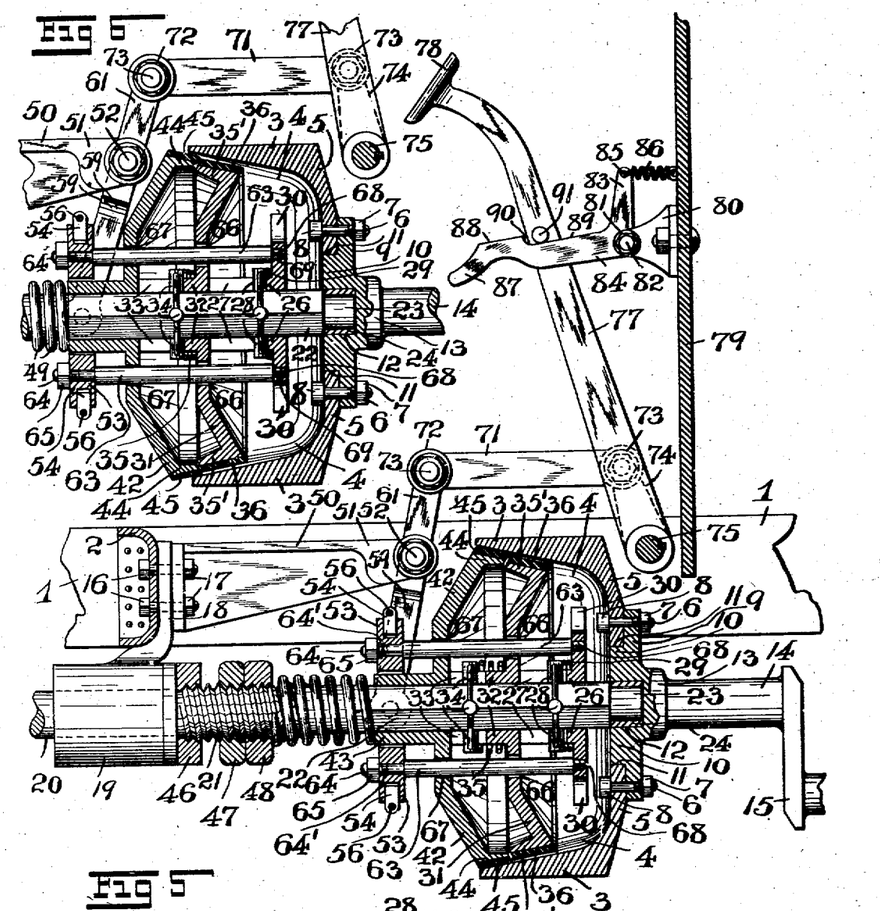
Fig. 5 is a view, similar to that shown in Figs. 2 and 4, illustrating the direct-drive disk or plate and one of the friction-cones both forced out of their operative engagement, when running under reduced frictional contact.
Fig. 6 is a detail longitudinal section of the driving-cone and the various parts of mechanism directly connected therewith, said view illustrating the general arrangement of the direct-drive disk or plate and the various friction-cones all thrown out of their engaged relations with the driving-cone, when the shaft which is to be driven is disconnected from the driving-shaft.

The means for producing reciprocatory movements of the direct-drive disk or plate and of the various friction-cones, consists of a suitable bracket 50 which is secured to one of the cross-bars 2, substantially in the manner shown, and is provided with a bifurcated end-portion 51 carrying a pintle 52. Upon the hub 43 of the friction-cone 42 is arranged an annular disk or plate 53 provided with a grooved marginal edge-portion into which are fitted, substantially as shown in the several figures of the drawings, a pair of semi-circular members 54, said members being provided with the perforated end-lugs 55, and being secured in place by means of bolts 56 and nuts 57, as illustrated in Fig. 8 of the drawings. Connected with suitable studs or pins 58 of each semi-circular member 54 are the end-portions 60 of a yoke 59, said yoke having an upwardly extending arm or lever 61 which oscillates upon the pintle 52 hereinabove mentioned. Connecting rods or stems 63 have their shouldered end-portions 64, which are screw-threaded, extending into and through perforations or holes 64' in said disk or plate 53, nuts 65 being screwed upon the projecting ends to rigidly secure said rods 63 in place. The bodies of said rods extend into and through correspondingly located openings or holes 66 and 67 formed in the respective friction-cones 31 and 42, substantially as shown, the cones being capable of moving freely upon said rods. The opposite ends of said rods are formed with shouldered end-portions 68, which are screw-threaded, as shown, and are securely screwed in screw-threaded holes 69 in the positive drive-disk or plate 25. When thus connected, the various devices and parts are operatively connected in the manner clearly represented in Fig. 2 of the drawings. To the upper end of said arm or lever 61 is pivoted by means of a pin or bolt 70 the bifurcated end-portion 72 of a link 71, said link having its opposite and bifurcated end-portion 73 pivotally connected with a crank-arm 74 extending upwardly from a rock-shaft 75. This rock-shaft has its end-portions mounted in suitable bearings 76, see Fig. 1, and suitably secured upon said shaft is a lever 77 which is provided upon its upper free end with a foot-piece 78. Suitably secured upon a portion of the "dash" 79 of the vehicle is a bracket 80 provided with a bifurcated part 81 in which is mounted a pintle or pin 82. A bell-crank comprising an upwardly extending arm 83 and an outwardly extending arm 84 provides a suitable trip-device or "kick-off" for the purposes to be presently described. The arm 83 is made with a hole 85 to which is secured one end of a coiled spring 86, said spring having its opposite end attached to the "dash" in any suitable manner. The arm 84 is made at its forward end-portion in the form of a toe-piece 87, and its upper marginal edge is made much higher at 88 than at 89, thereby providing a stop-portion 90, substantially as illustrated. The foot-lever 77 has extending from its side, nearest the arm 84, a stud or lug 91 which rides upon the marginal edge-portions 88 and 89 of the arm 84, the distended coils of the spring 86 always tending to produce an upward movement of the arm 84, whereby the upper marginal edge of said arm constantly bears against the stud or lug 91 as will be clearly understood from an inspection of the several figures of the drawings.

Having thus described the general arrangements and constructions of the various elements which comprise the features of my present invention, I will now briefly set forth the manipulation and operations of the parts.

Figures 2, 3:
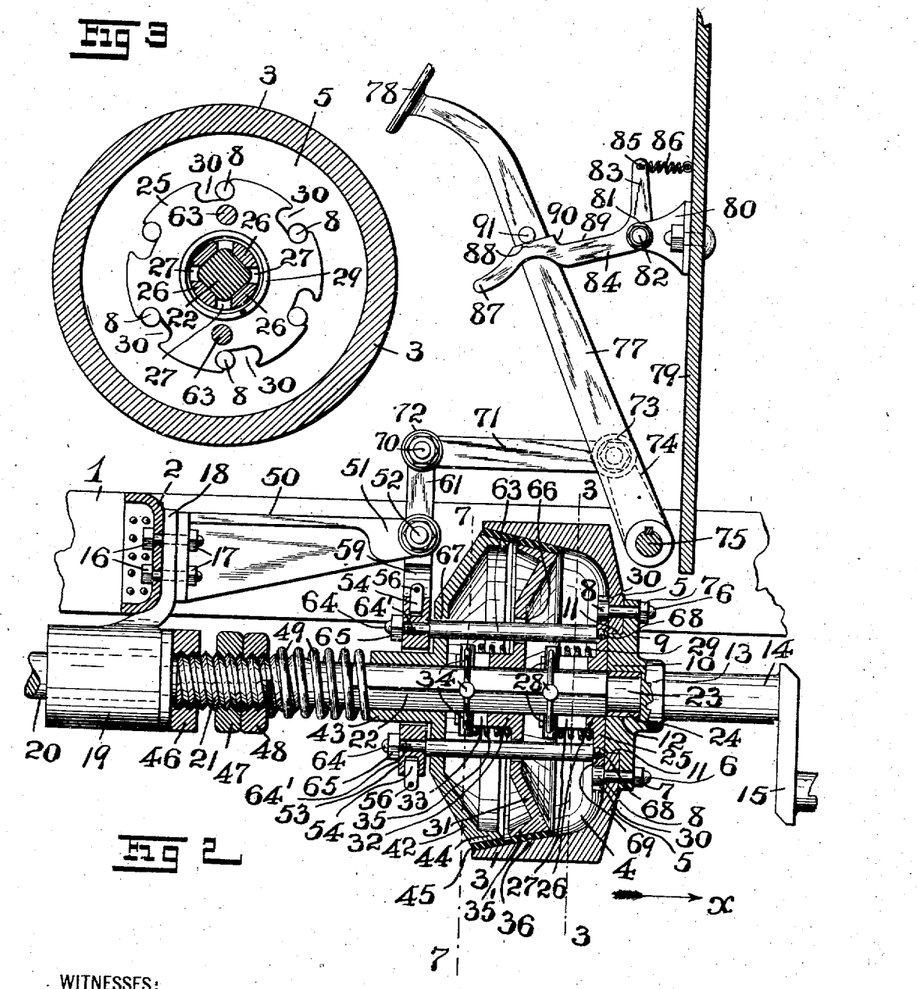
Fig. 2 is a longitudinal vertical section of the clutch, showing in elevation, portions of the power-driven shaft, the shaft which is to be driven, and a part of the main supporting frame, all the parts of the clutch being represented in their operative or engaged relations, when used as a combined direct and friction drive.
Fig. 3 is a vertical cross-section, taken on line 3—3 in said Fig. 2, looking in the direction of the arrow *x*.

Suppose, that under normal conditions, all the clutch-devices are in their engaged positions indicated in Fig. 2 of the drawings, that is, the positive drive-disk or plate 25 is in engagement with the heads 8 of the bolts 7, and the various friction-cones are in driving frictional engagement with the inner cone-surface of the driving-cone 3, and it is desired to throw out of operative engagement the direct-drive. The operator presses upon the foot-piece 78 of the lever 77, pushing the lever in a direction toward the "dash". The result is that through the system of levers or arms the disk or plate 25 can be brought into its inoperative position indicated in Fig. 4, whereby the positive clutch is cut out. The lever 77 can be retained in this position by the stud or lug 91 resting against the shouldered part 90, as a stop, as shown in said Fig. 4, in which case the various friction-cones remain in their operative engagement with the driving-cone. The disengagement of the various friction-cones is successively produced by the operator still further pressing the lever 77 in directions toward the dash, whereby the end of hub of disk or plate 25 is brought against the friction-cone 31 and moves it into the position shown in Fig. 5 of the drawings, thereby withdrawing its friction-surface or member 36 from its frictional engagement or contact with the driving-cone 3, as shown. In this relation, the parts can be readily retained by the operator holding his foot upon the foot-piece 78 of the lever 77. By an additional pressure of the foot upon said foot-piece 78 in the direction toward the "dash", the parts are moved into the positions indicated in Fig. 6 of the drawings, the hub of the friction-cone 31 being brought against the friction-cone 42 and moving it forwardly upon the shaft 20, whereby its friction surface or member 45 is also withdrawn from its frictional engagement or contact with the driving cone 3, in the manner illustrated in said Fig. 6.

By removing the pressure from the lever 77 and, by means of the foot, depressing the arm 84 of the bell-crank, the compressed springs 49, 35 and 29 will act in succession, and will in the following order return the friction-cone 42 and then the friction-cone 31 into their respective frictional engagement with the inner cone-surface of the driving-cone 3, and finally bringing the clutch-disk or plate 25 in its positive holding engagement with the heads 8 of the bolts 6. Thus, by gradually producing the various frictional binding or engaging relations of the various parts, the various devices or parts are finally brought together into their positively locked relations without any shock in suddenly starting or stopping the vehicle, and without any undue strain or danger of breakage or damage to the mechanism.

It will also be evident, that the operator will soon learn to use the mechanism for actuating and controlling the clutch-disk 25 and the various friction-cones in such a manner, that he can run his vehicle with but one of the friction-cones in actual operation, or with more than one friction-cone in operation, or with all of the friction-cones and the clutch-disk 25 in actual use, as may be desired.

I am aware, that various changes may be made in the arrangements and combinations of the devices and their parts, as well as in the details of the construction thereof without departing from the scope of the present invention, as defined in the appended claims. Hence I do not limit my invention to the exact arrangements and combinations of the devices and the parts thereof, as described in the foregoing specification and as illustrated in the accompanying drawings, nor do I confine myself to the exact details of the construction of any of the said parts.

I claim:

1. A clutch comprising a driving cone, a driving shaft connected with a portion of said cone, a shaft to be driven, said shaft being normally disconnected from said driving cone and said driving shaft, a positive clutch disk, and a series of independently acting friction-cones, all arranged to be successively operated for producing a combined active engagement of said clutch disk and said friction-cones, and each friction cone receiving its maximum amount of thrust before the next following cone-section is brought in operative contact, substantially as and for the purposes set forth.

2. A clutch comprising a driving cone, a driving shaft connected with a portion of said cone, a shaft to be driven, said shaft being normally disconnected from said driving cone and said driving shaft, a positive clutch disk, and a series of independently acting friction-cones, all arranged to be successively operated for producing a combined active engagement of said clutch disk and said friction-cones, and each friction cone receiving its maximum amount of thrust before the next following cone-section is brought in operative contact, combined with means for producing an inactive relation of the clutch disk, while the friction-cones are in their active engagement, substantially as and for the purposes set forth.

3. A clutch comprising a driving cone, a driving shaft connected with a portion of said cone, a shaft to be driven, said shaft being normally disconnected from said driving-cone and said driving shaft, a positive clutch disk, and a series of independently acting friction-cones, all arranged to be successively operated for producing a combined active engagement of said clutch disk and said friction-cones, and each friction cone receiving its maximum amount of thrust before the next following cone-section is brought in operative contact, combined with means for producing an inactive relation of the clutch disk, means for producing an inactive relation for one of said friction-cones while the remaining friction-cone is still in engagement, substantially as and for the purposes set forth.

4. A clutch comprising a driving cone, a driving shaft connected with a portion of said cone, a shaft to be driven, said shaft being normally disconnected from said driving cone and said driving shaft, a positive clutch-disk, and a series of independently acting friction-cones, all arranged to be successively operated for producing a combined active engagement of said clutch disk and said friction-cones, and each friction cone receiving its maximum amount of thrust before the next following cone-section is brought in operative contact, and means for successively forcing said clutch disk and all of said friction-cones into inactive relations, substantially as and for the purposes set forth.

5. A clutch comprising a driving cone, a driving-shaft connected with a portion of said cone, a shaft to be driven, said shaft being normally disconnected from said cone and said driving-shaft, a spring-controlled positive clutch disk, and a series of spring-controlled and independently acting friction-cones, all arranged to be successively operated for producing a combined active engagement of said clutch-disk and said friction-cones, and each friction cone receiving its maximum amount of thrust before the next following cone-section is brought in operative contact, substantially as and for the purposes set forth.

6. A clutch comprising a driving cone, a driving-shaft connected with a portion of said cone, a shaft to be driven, said shaft being normally disconnected from said cone and said driving-shaft, a spring-controlled positive clutch disk, and a series of spring-controlled and independently acting friction-cones, all arranged to be successively operated for producing a combined active engagement of said clutch-disk and said friction-cones, and each friction cone receiving its maximum amount of thrust before the next following cone-section is brought in operative contact, combined with means for producing an inactive relation of the clutch disk, while the friction-cones are in their active engagement, substantially as and for the purposes set forth.

7. A clutch comprising a driving cone, a driving-shaft connected with a portion of said cone, a shaft to be driven, said shaft being normally disconnected from said cone and said driving-shaft, a spring-controlled positive clutch disk, and a series of spring-controlled and independently acting friction-cones, all arranged to be successively operated for producing a combined active engagement of said clutch-disk and said friction-cones, and each friction cone receiving its maximum amount of thrust before the next following cone-section is brought in operative contact, combined with means for producing an inactive relation of the clutch disk, means for producing an inactive relation for one of said friction cones while the remaining friction-cone is still in engagement, substantially as and for the purposes set forth.

8. A clutch comprising a driving cone, a driving-shaft connected with a portion of said cone, a shaft to be driven, said shaft being normally disconnected from said cone and said driving-shaft, a spring-controlled positive clutch disk, and a series of spring-controlled and independently acting friction-cones, all arranged to be successively operated for producing a combined active engagement of said clutch-disk and said friction-cones, and each friction cone receiving its maximum amount of thrust before the next following cone-section is brought in operative contact, and means for successively forcing said clutch-disk and all of said friction-cones into inactive relations, substantially as and for the purposes set forth.

9. A clutch comprising a driving-cone, a driving shaft connected with a portion of said cone, a second shaft to be driven, said shaft being normally disconnected from said cone and said driving shaft, said second shaft being provided with a squared portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch-disk and friction-cones all being arranged to be successively operated for producing a combined active engagement of said clutch-disk and said friction-cone, and radial posts projecting from the squared portion of the shaft which is to be driven, said posts extending into the slotted portions of the hubs of said clutch-plate and said friction-cone, substantially as and for the purpoes set forth.

10. A clutch comprising a driving cone, a driving shaft connected with a portion of said cone, a second shaft to be driven, said shaft being normally disconnected from said cone and said driving shaft, said second shaft being provided with a squared portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch-disk and friction-cones all being arranged to be successively operated for producing a combined active engagement of said clutch-disk and said friction-cones, and radial posts projecting from the squared portion of the shaft which is to be driven, said posts extending into the slotted portions of the hubs of said clutch-plate and said friction-cone, combined with means for producing an inactive relation of the clutch disk, while the friction-cones are in their active engagement, substantially as and for the purposes set forth.

11. A clutch comprising a driving cone, a driving shaft connected with a portion of said cone, a second shaft to be driven, said shaft being normally disconnected from said cone and said driving shaft, said second shaft being provided with a squared portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch-disk and friction-cones all being arranged to be successively operated for producing a combined active engagement of said clutch-disk and said friction-cones, and radial posts projecting from the squared portion of the shaft which is to be driven, said posts extending into the slotted portions of the hubs of said clutch-plate and said friction-cone, combined with means for producing an inactive relation of the clutch-disk, means for producing an inactive relation for one of said friction-cones while the remaining friction cone is still in engagement, substantially as and for the purposes set forth.

12. A clutch comprising a driving cone, a driving shaft connected with a portion of said cone, a second shaft to be driven, said shaft being normally disconnected from said cone and said driving shaft, said second shaft being provided with a squared portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch-disk and friction-cones all being arranged to be successively operated for producing a combined active engagement of said clutch-disk and said friction-cones, and radial posts projecting from the squared portion of the shaft which is to be driven, said posts extending into the slotted portions of the hubs of said clutch-plate and said friction-cone, and means for successively forcing said clutch disk and all of said friction-cones into inactive relations, substantially as and for the purposes set forth.

13. A clutch comprising a driving-cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch disk and friction-cones all being arranged to be successively operated for producing a combined active engagement of said clutch-disk and said friction-cones, radial posts projecting from the squared portion of said second shaft, said posts extending into the slotted parts of the hubs of said clutch-plate and said friction cone, a coiled spring upon the slotted hub of said clutch-plate, and a coiled spring upon the slotted hub of said friction-cone, each spring being adapted to be brought in compression against the radially extending posts, and a spring encircling that portion of said second shaft between the adjusting nut and the hub of the nearest located friction-cone, substantially as and for the purposes set forth.

14. A clutch comprising a driving-cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch disk and friction-cones all being arranged to be successively operated for producing a combined active engagement of said clutch-disk and said friction-cones, radial posts projecting from the squared portion of said second shaft, said posts extending into the slotted parts of the hubs of said clutch-plate and said friction cone, a coiled spring upon the slotted hub of said clutch-plate, and a coiled spring upon the slotted hub of said friction-cone, each spring being adapted to be brought in compression against the radially extending posts, and a spring encircling that portion of said second shaft between the adjusting nut and the hub of the nearest located friction-cone, combined with means for producing an inactive relation of the clutch disk while the friction-cones are in their active engagement, substantially as and for the purposes set forth.

15. A clutch comprising a driving-cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch disk and friction-cones all being arranged to be successively operated for producing a combined active engagement of said clutch-disk and said friction-cones, radial posts projecting from the squared portion of said second shaft, said posts extending into the slotted parts of the hubs of said clutch-plate and said friction cone, a coiled spring upon the slotted hub of said clutch-plate, and a coiled spring upon the slotted hub of said friction-cone, each spring being adapted to be brought in compression against the radially extending posts, and a spring encircling that portion of said second shaft between the adjusting nut and the hub of the nearest located friction-cone, combined with means for producing an inactive relation of the clutch-disk, means for producing an inactive relation for one of said friction-cones while the remaining friction-cone is still in engagement, substantially as and for the purposes set forth.

16. A clutch comprising a driving cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch-disk provided with a slotted hub arranged upon the squared portion of said shaft, and a series of independently acting friction-cones, said friction-cones being provided with hubs arranged upon the squared portion of said shaft, and the hub of one of said friction-cones being slotted, said clutch-disk and friction-cones all being arranged to be successively operated for producing a combined active engagement of said clutch-disk and said friction-cones, radial posts projecting from the squared portion of said second shaft, said posts extending into the slotted parts of the hubs of said clutch-plate and said friction-cone, a coiled spring upon the slotted hub of said clutch-plate, and a coiled spring upon the slotted hub of said friction-cone, each spring being adapted to be brought in compression against the radially extending posts, and a spring encircling that portion of said second shaft between the adjusting nut and the hub of the nearest located friction-cones, and means for successively forcing said clutch-disk and all of said friction-cones into inactive relations, substantially as and for the purposes set forth.

17. A clutch comprising a driving cone, a driving shaft connected with a portion of said cone, a shaft to be driven, said shaft being normally disconnected from said cone and said driving shaft, a spring-controlled positive clutch-disk, a series of spring-controlled and independently acting friction-cones, said cones being provided with registering openings, all combined with mechanism for successively moving said clutch-disk and said friction-cones, consisting of a yoke, connecting stems, each stem being secured at one end to said yoke, said stems passing through the openings in said friction-cones and being secured at their opposite ends to said clutch-disk, and means for producing oscillatory movements of said yoke, substantially as and for the purposes set forth.

18. A clutch comprising a driving cone, a driving shaft connected with a portion of said cone, a shaft to be driven, said shaft being normally disconnected from said cone and said driving shaft, a spring-controlled positive clutch-disk, a series of spring-controlled and independently acting friction-cones, said cones being provided with registering openings, all combined with mechanism for successively moving said clutch-disk and said friction-cones, consisting of a yoke, connecting stems, each stem being secured at one end to said yoke, said stems passing through the openings in said friction-cones and being secured at their opposite ends to said clutch-disk, an oscillatory arm extending from said yoke, a rock-shaft, a crank-arm on said rock-shaft, a link between said crank-arm and said oscillatory arm, and a foot-lever secured to said rock-shaft, substantially as and for the purposes set forth.

19. A clutch comprising a driving cone, a driving shaft connected with a portion of said cone, a shaft to be driven, said shaft being normally disconnected from said cone and said driving shaft, a spring-controlled positive clutch-disk, a series of spring-controlled and independently acting friction-cones, said cones being provided with registering openings, all combined with mechanism for successively moving said clutch-disk and said friction-cones, consisting of a yoke, connecting stems, each stem being secured at one end to said yoke, said stems passing through the openings in said friction-cones and being secured at their opposite ends to said clutch-disk, an oscillatory arm extending from said yoke, a rock-shaft, a crank-arm on said rock-shaft, a link between said crank-arm and said oscillatory arm, a foot-lever secured to said rock-shaft, a laterally extending stud on said foot-lever, and a spring-controlled "kick-off" having its edge-portion in slidable engagement with the stud of said foot-lever, substantially as and for the purposes set forth.

20. A clutch comprising a driving cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch-disk provided with a slotted hub arranged upon the squared portion of said shaft, and a series of independently acting friction-cones, said cones being provided with registering openings, and each friction-cone being provided with a hub arranged upon the squared portion of said shaft, and the hub of one of said friction-cones being slotted, said clutch-disk and friction-cones all being arranged to be successively operated for producing a combined active engagement of said clutch-disk and said friction-cones, radial posts projecting from the squared portion of said second shaft, said posts extending into the slotted parts of the hubs of said clutch-plate and said friction-cone, a coiled spring upon the slotted hub of said clutch-plate, and a coiled spring upon the slotted hub of said friction-cone, each spring being adapted to be brought in compression against the radially extending posts, a spring encircling that portion of said second shaft between the adjusting nut and the hub of the nearest friction-cone, all combined with mechanism for successively moving said clutch-disk and said friction-cones, consisting of a yoke, connecting stems, each stem being secured at one end to said yoke, said stems passing through the openings in said friction-cones and being secured at their opposite ends to said clutch-disk, and means for producing oscillatory movements of said yoke, substantially as and for the purposes set forth.

21. A clutch comprising a driving cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch-disk provided with a slotted hub arranged upon the squared portion of said shaft, and a series of independently acting friction-cones, said cones being provided with registering openings, and each friction-cone being provided with a hub arranged upon the squared portion of said shaft, and the hub of one of said friction-cones being slotted, said clutch-disk and friction-cones all being arranged to be successively operated for producing a combined active engagement of said clutchdiskt and said friction-cones, radial posts projecting from the squared portion of said second shaft, said posts extending into the slotted parts of the hubs of said clutch-plate and said friction-cone, a coiled spring upon the slotted hub of said clutch-plate, and a coiled spring upon the slotted hub of said friction-cone, each spring being adapted to be brought in compression against the radially extending posts, a spring encircling that portion of said second shaft between the adjusting nut and the hub of the nearest friction-cone, all combined with mechanism for successively moving said clutch-disk and said friction-cones, consisting of a yoke, connecting stems, each stem being secured at one end to said yoke, said stem passing through the openings in said friction-cones and being secured at their opposite ends to said clutch-disk, an oscillatory arm extending from said yoke, a rock-shaft, a crank-arm on said rock-shaft, a link between said crank-arm and said oscillatory arm, and a foot-lever secured to said rock-shaft, substantially as and for the purposes set forth.

22. A clutch comprising a driving cone, a driving shaft connected with a portion of said cone, a second shaft to be driven, said shaft being normally disconnected from said cone and said driving shaft, said second shaft being provided with a squared portion and a screw-threaded portion, an adjusting nut on said screw-threaded portion, a positive clutch-disk provided with a slotted hub arranged upon the squared portion of said shaft, and a series of independently acting friction-cones, said cones being provided with registering openings, and each friction-cone being provided with a hub arranged upon the squared portion of said shaft, and the hub of one of said friction-cones being slotted, said clutch-disk and friction-cones all being arranged to be successively operated for producing a combined active engagement of said clutch-disk and said friction-cones, radial posts projecting from the squared portion of said second shaft, said posts extending into the slotted parts of the hubs of said clutch-plate and said friction-cone, a coiled spring upon the slotted hub of said clutch-plate, and a coiled spring upon the slotted hub of said friction-cone, each spring being adapted to be brought in compression against the radially extending posts, a spring encircling that portion of said second shaft between the adjusting nut and the hub of the nearest friction-cone, all combined with mechanism for successively moving said clutch-disk and said friction-cones, consisting of a yoke, connecting stems, each stem being secured at one end to said yoke, said stem passing through the openings in said friction-cones, and being secured at their opposite ends to said clutch-disk, an oscillatory arm extending from said yoke, a rock-shaft, a crank-arm on said rock-shaft, a link between said crank-arm and said oscillatory arm, a foot-lever secured to said rock-shaft, a laterally extending stud on said foot-lever, and a spring-controlled "kick-off" having its edge-portion in slidable engagement with the stud of said foot-lever, substantially as and for the purposes set forth.

23. A clutch comprising a driving cone, a driving shaft connected with a portion of said cone, a shaft to be driven, said shaft being normally disconnected from said driving cone and said driving shaft, a positive clutch-disk, a plate on said driving shaft, bolts extending from said plate, and a head on each bolt, said clutch-disk being provided with open portions adapted to be fitted over the heads of said bolts for the positive engagement of said clutch-disk with the plate on said driving shaft, and said open portions being adapted to be moved away from said bolt-heads, substantially as and for the purposes set forth.

24. A clutch comprising a driving cone, a driving shaft connected with a portion of said cone, a shaft to be driven, said shaft being normally disconnected from said driving cone and said driving shaft, a positive clutch-disk, a plate on said driving shaft, bolts extending from said plate, and a head on each bolt, said clutch-disk being provided with open portions adapted to be fitted over the heads of said bolts for the positive engagement of said clutch-disk with the plate on said driving shaft, and a series of independently acting friction-cones, all arranged to be successively operated for producing a combined active engagement of said clutch-disk and said friction-cones, substantially as and for the purposes set forth.

25. A clutch comprising a driving cone, a driving shaft connected with a portion of said cone, a shaft to be driven, said shaft being normally disconnected from said driving cone and said driving shaft, a positive clutch-disk, a plate on said driving shaft, bolts extending from said plate, and a head on each bolt, said clutch-disk being provided with open portions adapted to be fitted over the heads of said bolts for the positive engagement of said clutch-disk with the plate on said driving shaft, and a series of independently acting friction-cones, all arranged to be successively operated for producing a combined active engagement of said clutch-disk and said friction-cones, combined with means for producing an inactive relation of the clutch-disk, while the friction cones are in their active engagement, substantially as and for the purposes set forth.

26. In a clutch-mechanism, the combination, with a shaft, of a plate on said shaft, bolts extending from said plate, a head on each bolt, and a positive clutch-disk provided with open portions adapted to be fitted over the heads of said bolts for the positive engagement of said clutch-disk with said plate, and said open portions being adapted to be moved away from said bolt-heads, substantially as and for the purposes set forth.

In testimony, that I claim the invention set forth above I have hereunto set my hand this 17th day of January, 1907.

THOMAS J. BUTLER.

Witnesses:
FREDK. C. FRAENTZEL,
FREDERICK JAMISON.